June 20, 1944.  A. RAPPL  2,352,120
WINDSHIELD CLEANER CONTROL
Filed Jan. 2, 1943
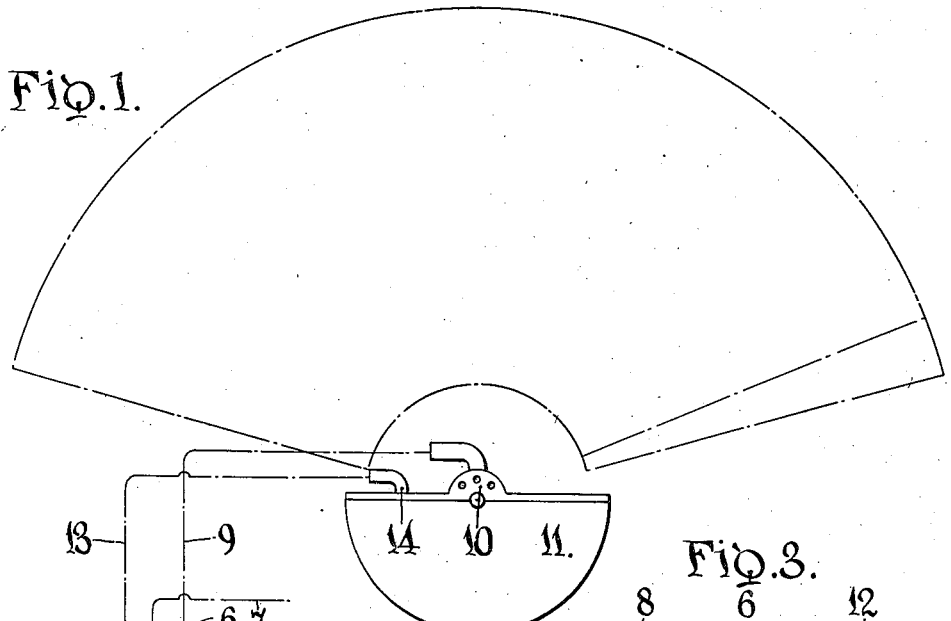
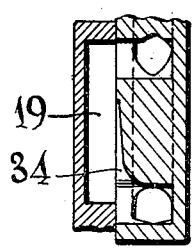
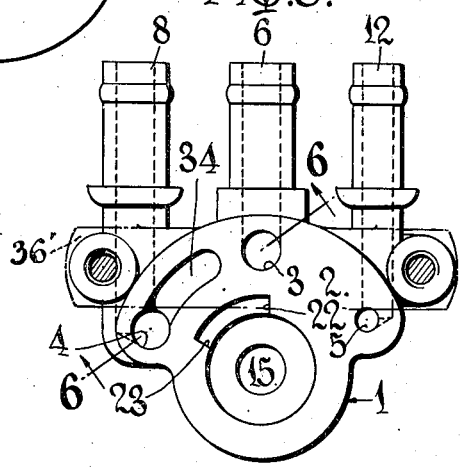
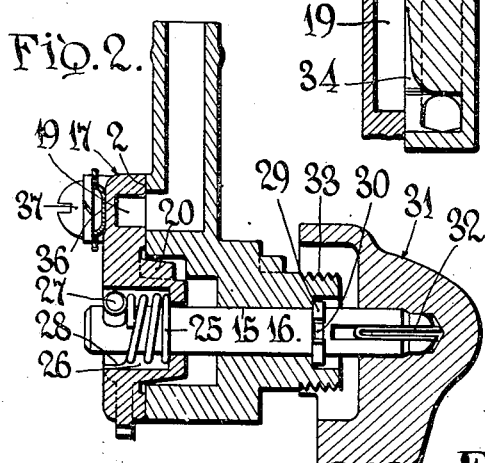
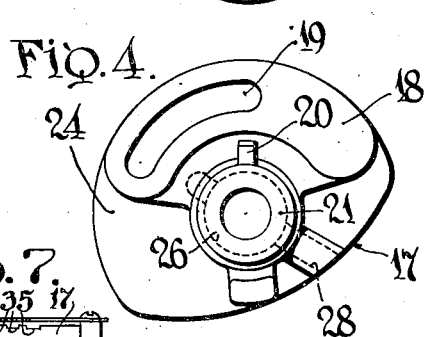
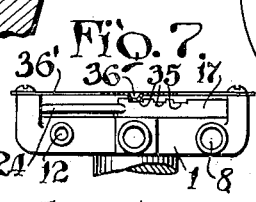
INVENTOR
*Anton Rappl*
BY
*Bean, Brooks, Buckley & Bean*
ATTORNEYS Patented June 20, 1944

2,352,120

UNITED STATES PATENT OFFICE 2,352,120

WINDSHIELD CLEANER CONTROL

Anton Rappl, Buffalo, N. Y., assignor to Trico Products Corporation, Buffalo, N. Y.

Application January 2, 1943, Serial No. 471,150

10 Claims. (Cl. 251—87)

This invention relates to a windshield cleaner system and primarily to a control valve therefor. In the present day windshield cleaner which is operated by fluid pressure, such as the low pressure maintaining in the intake manifold of the vehicle engine, the motor piston is operable back and forth by a fluid pressure differential which is reversed in its application to the piston at the end of each stroke. This reversal is effected by automatic valve mechanism, and when it is desired to park the wiper to one side of the cleaned field of vision the actuating pressure is by-passed about the automatic valve mechanism and applied continuously to one side of the motor so as to hold the wiper in its arrested position.

The primary object of the present invention is to provide an efficient control valve for so controlling the operation and the parking of the wiper which is of practical design and economical construction. Furthermore, the invention has for its object to provide a control valve in which the speed of wiper operation may be readily controlled and adjusted with a minimum distraction of attention of the motorist to his other important duties so vital for safe driving.

In the drawing depicting one embodiment of the present invention

Fig. 1 illustrates a windshield cleaner system utilizing the control valve of the present invention;

Fig. 2 is a sectional view through the control valve;

Fig. 3 is a plan view of the valve seat;

Fig. 4 is a bottom plan view of the seat engaging face of the valve;

Fig. 5 is a top plan view of the valve;

Fig. 6 is a fragmentary sectional view about on line 6—6 of Fig. 3, depicting the throttling passage of the control; and Fig. 7 is a cross sectional view showing more particularly the spring detent.

Referring more particularly to the drawing, the improved control comprises a body or casing 1 having a valve engaging seat 2 through which opens a suction supply port 3, an operating port 4 and a parking port 5, these three ports communicating with passages formed in corresponding nipples projecting from the body, the nipple 6 connecting the supply port to the fluid line as diagrammatically illustrated at 7 which leads to the intake manifold or other source of pressure supply, the nipple 8 connecting the operating port to a conduit 9 leading to the valve seat 10 of the automatic valve mechanism (not shown) of the windshield cleaner motor 11, and the nipple 12 connecting the parking port to a conduit 13 leading to the parking passage 14 of the motor. The automatic valve mechanism and parking arrangement may be of that type shown in my copending application Serial No. 337,966.

The ports 3, 4 and 5 are herein arranged in an arcuate series concentric about a shaft bearing 15 in which is journaled a shaft 16 protruding at each end of the preferably die cast body 1. Mounted on one end of the shaft and over the valve seat 2 is a valve 17 of irregular disk form which may likewise be of die cast design. The valve is provided on its inner face with a raised pad 18 having in one end portion a recess 19 of sufficient extent to connect port 3 to either of ports 4 or 5. The two extreme positions of the valve, in which the motor is either operating or parked, are determined by a lug or shoulder 20 on the hub 21 of the valve engaging either shoulder 22 at the opposite ends of a recess 23 in the body 1. When the recess 19 is connecting the ports 3 and 4 the parking port 5 is open to the atmosphere and for this purpose the underside of the valve 17 is relieved, as shown at 24, so as to provide an underlying space opening to the atmosphere at the side or margin of the valve.

The valve is urged to its seat by a spring 25 encircling the outer end of the shaft 16 and fitting within a counter bore 26 in the outer face of the valve, the spring being held under tension by a pin 27. The pin is inserted in a diametral opening through the shaft and seated in a radial groove 28 in the outer face of the valve and therefore serves additionally to connect the valve to the shaft for rotation therewith. A split washer 29 fitting in a groove 30 in the opposite and protruding end portion of the shaft cooperates with the key pin 27 to hold the shaft in place. A handle 31 may be removably secured to the latter end of the shaft by a key member 32. This provides a simple and compact structure in which the major valve parts are readily die cast, the body being provided with a threaded anchoring extension 33 about the split washer 29 by which a clamping nut (not shown) may be used for mounting the device on the instrument board of the motor vehicle.

In operation, a turning of the handle in a clockwise direction will connect the motor to the supply port 3 for wiping operation. A reverse turning of the handle and its connected shaft 16 will bring the valve to a wiper parking position and in this connection it will be noted that the parking port 5 is restricted relative to the remaining ports for practical reasons.

For regulating the speed of the windshield cleaner the valve seat is provided with a shallow motor throttling groove 34 which gradually deepens toward and into communication with the operating port 4. Therefore, if the valve is moved short of its maximum motor operating position, the recess 19 will communicate with the operating port 4 through the graduated recess 34 and correspondingly restrict its communication with the supply port 3 thereby reducing the pressure supply to the motor and accordingly modifying the speed of wiper operation. When positioned short of its full motor operating position the end of the pad 18 not provided with the recess will close over the thus elongated operating port 4, 34, to block any atmospheric communication at this time. For locating the preferred speed modifying positions of the valve the outer surface of the latter is formed with a plurality of depressions or seats 35 adapted to receive a spring detent 36 which may consist of a spring leaf 36' held in a chordal position by screws 37, the operation of the detent being such that it will yield out of the depressions 35 in the presence of a predetermined torque applied by the handle 31. This construction enables the operator to modify his wiper speed in accordance with the demands of the wiper.

The control valve is practical in design and may be economically manufactured, and while the foregoing description has been given in detail, it is obvious that the inventive principles involved are capable of assuming other physical embodiments without departing from the spirit or scope of the invention claimed.

What is claimed is:

1. A control valve for windshield cleaners, comprising a mounting body having a valve seat with a supply port and an operating port, a pivotally mounted disk-like valve member operable on the seat and having in its seating face a recess movable to connect the two ports, means for oscillating the valve member, and a flat spring secured at its opposite ends to the body and having its intermediate portion extending across the back face of the valve member, the spring lying substantially chordal across the arcuate path of the valve member and carrying a detent bearing upon and engageable in a recess in the back face for holding the valve member operative.

2. A control valve comprising a body having a shaft bearing and an arcuate valve seat thereabout provided with a supply port intermediate an operating port and a parking port, a shaft journaled in the bearing and provided with operating means on one end, a valve member mounted on the opposite end and having a part with one face engaging the seat and formed in the face with a passage adapted to selectively connect the supply port to either of the remaining ports, the opposite face of said part having a radial groove registering with a hole in the shaft, a key pin engaged in the shaft hole and seating in the radial groove to key the shaft to the valve member, and a spring encircling the shaft and bearing upon said one face to yieldably hold the pin in the groove.

3. A control valve comprising a body having a shaft bearing and an arcuate valve seat thereabout provided with a supply port and an operating port, a shaft journaled in the bearing, a valve member on the shaft having a part engaging the seat with a passage adapted to connect the ports, a spring coiled about the shaft and acting on the valve member to urge it firmly to its seat, and a retaining pin for the spring engaged in an opening in the shaft and acting to key the latter to the valve member for rotation therewith.

4. A control valve comprising a body having a shaft bearing and an arcuate valve seat thereabout provided with a supply port intermediate an operating port and a parking port, a shaft journaled in the bearing and provided with a handle on one end, a valve member mounted on the opposite end and having a part engaging the seat and formed with a passage adapted to selectively connect the supply port to either of the remaining ports, a spring coiled about the shaft and acting on the valve member to urge it firmly to its seat, a retaining pin for the spring engaged in an opening in the shaft and acting to key the latter to the valve member for rotation therewith, and means for determining an open position of the valve member on its seat intermediate its fully opened and its fully closed positions.

5. A control valve comprising a body having a shaft bearing and a valve seat provided with a port means, a shaft journaled in the bearing and protruding therefrom at both ends, a valve member removably mounted on one end of the shaft, a spring urging the valve member to its seat, means keying the valve member to the shaft and backing the spring, and retainer means removably engaging the opposite end of the shaft and held in abutting relation to the body by said spring.

6. A control valve comprising a body having a shaft bearing and an arcuate seat lying in a plane laterally thereof, a shaft mounted in the bearing, a disk-like valve member on the shaft extending laterally therefrom over the seat for oscillation thereon, the valve member having on one side a seat engaging face formed with a recess spaced laterally from the shaft to connect ports in the seat, and a flat spring bearing on the opposite side of the valve member directly over the recess, said flat spring being mounted on the body and extending in the direction of movement of the valve member whereby the latter may oscillate beneath the flat spring.

7. A control valve comprising a body having a shaft bearing and an arcuate seat lying in a plane laterally thereof, a shaft mounted in the bearing, a disk-like valve member on the shaft extending laterally therefrom over the seat for oscillation thereon, the body having a recess about the shaft with spaced shoulders therein, the valve member having a hub extension nesting in the body recess and having a part interengaging with the shoulders to limit oscillatory movement of the valve member on its seat, a spring bearing on the valve member to urge it along the shaft to the seat, means interlocking the shaft to the valve member for such movement, and detent means overhanging the outer margin of the valve member and acting to hold it on its seat.

8. A control valve comprising a body having a shaft bearing and a concentric seat with a like series of three ports, a shaft journaled in the bearing, a valve member on the shaft having a radially extending part with one face engaged with the seat, said valve face having a recess for connecting either end port with the intermediate port, a flat spring extending across the opposite face of said part substantially chordal to the path thereof, and means supporting the spring on the body to engage said opposite face for seating the valve member.

9. A control valve comprising a body having a shaft bearing and a concentric seat with a plurality of ports, a pivotally mounted disk-like valve member having in its seating face a recess for connecting the ports, a flat spring supported at its opposite ends on the body with the intermediate portion of the spring extending across and bearing on the opposite face of the valve member to urge the latter to its seat, the spring lying substantially chordal of the arcuate path of movement of the valve member.

10. A control valve comprising a body having a shaft bearing and a valve seat provided with port means, a shaft journaled in the bearing and protruding therefrom at both ends, a valve member removably mounted on one end of the shaft, a coil spring encircling the shaft and urging the valve member to its seat, a pin engaged in a transverse hole in the shaft and extending radially therefrom to retain the spring operative, the back face of the valve member having a radial groove receiving the pin to thereby key the valve member to the shaft, the opposite end of the shaft having a shoulder held in abutting relation to the body by said spring, and means engaged with the opposite end of the shaft for actuating the valve.

ANTON RAPPL.